United States Patent [19]
Tanahashi et al.

[11] Patent Number: 5,938,957
[45] Date of Patent: Aug. 17, 1999

[54] PLANAR HEATING DEVICE FOR A MIRROR AND METHOD OF PRODUCING THE SAME

[75] Inventors: Kazuyuki Tanahashi, Yokohama; Yoshitaka Okano, Hachiohji; Nobuhiro Sakai, Isehara, all of Japan

[73] Assignee: Tokyo Cosmos Electric Co., Ltd., Tokyo, Japan

[21] Appl. No.: 08/908,666

[22] Filed: Aug. 6, 1997

[30] Foreign Application Priority Data

Aug. 21, 1996 [JP] Japan ................................. 8-219905

[51] Int. Cl.⁶ ...................................................... H05B 1/00
[52] U.S. Cl. .............................................................. 219/219
[58] Field of Search ................................ 219/219, 203

[56] References Cited

U.S. PATENT DOCUMENTS

| | | | |
|---|---|---|---|
| 3,790,748 | 2/1974 | Van Laethem et al. | 219/219 |
| 4,857,711 | 8/1989 | Watts | 219/548 |
| 5,198,639 | 3/1993 | Smuckler | 219/219 |
| 5,222,000 | 6/1993 | Adler | 359/847 |
| 5,380,981 | 1/1995 | Feldman et al. | 219/219 |
| 5,408,069 | 4/1995 | Mischel | 219/219 |
| 5,408,574 | 4/1995 | Deevi et al. | 392/404 |
| 5,560,796 | 10/1996 | Yoshimura | 156/240 |
| 5,716,536 | 2/1998 | Yokoto et al. | 219/219 |

*Primary Examiner*—Teresa Walberg
*Assistant Examiner*—Daniel Robinson
*Attorney, Agent, or Firm*—Pollock, Vande Sande & Amernick

[57] ABSTRACT

A planar heating device for a mirror. The device comprises a glass film 18 formed on a metallic chrome film 16b on the back side of the mirror; a group of electrodes formed on the glass film, the group including main electrodes 3, 4, power terminal lead electrodes 5, 6 and sub-electrodes 7, 8; a resistance film 9 formed so as to cover the sub-electrodes; an electrically insulating film 20 formed on the resistance film 9 and the group of electrodes; and power terminals 11, 12 or power lead lines soldered to the respective power terminal lead electrodes 5, 6. The glass film 18 is formed directly on the back side of the mirror by screen printing or a spray process. The group of electrodes and the resistance film 9 are formed directly on the back side of the mirror by screen printing. Silver electrically conductive ink having inorganic glass as binder is used as a material for the group of electrodes. The glass film 18, the group of electrodes and the resistance film 9 may be printed in advance on a transfer paper sheet, followed by being transferred onto the back side of the mirror by a water transfer process.

2 Claims, 5 Drawing Sheets

PLANAR HEATING DEVICE FOR A MIRROR AND METHOD OF PRODUCING THE SAME

FIELD OF THE INVENTION

This invention relates to a planar heating device for a mirror, and particularly to a built-in planar heating device directly printed or transfer printed on the backside of a mirror.

BACKGROUND OF THE INVENTION

A prior art planar heating device 10 adapted to be attached to the backside of a vehicle mirror for the purpose of defogging, defrosting and/or de-icing will be described with reference to FIGS. 1A and 1B. A pair of main electrodes 3, 4 in the form of a strip are printed on one side surface of a flexible electrically insulating sheet 2 such as polyethylene terephthalate along the upper and lower end edges thereof in opposing relation with each other. FIG. 1A is an illustration of the insulating sheet 2 as seen through the other side surface thereof, assuming that the sheet is transparent. Power terminal lead electrodes 5 and 6 are formed such that they extend from the corresponding main electrodes 3, 4 toward each other, terminating in power terminal connections 5a and 6a, respectively in opposing proximity with each other. Comblike sub-electrodes 7 and 8 are formed by printing so as to extend from the corresponding main electrodes 3, 4 and power terminal lead electrodes 5 and 6 into interdigitated relation. A film 9 of resistive material is formed on the one side surface of the insulating sheet 2 to cover the sub-electrodes 7 and 8 as shown in FIG. 1B.

A pair of power terminals 11, 12 are staked to the other side surface of the insulating sheet 2 at the respective power terminal connections 5a and 6a by means of eyelet pieces 13 to be connected with the power terminal connections 5a and 6a. In many instances, the planar heating device 10 is completed with a double faced adhesive tape 15 applied to the one side surface of the insulating sheet 2 having the film 9 of resistive material formed thereon. The adhesive tape 15 is bonded to a deposited metallic chrome film 16b on the backside of a glass layer 16a which cooperates with the chrome film to form a mirror.

The power terminal lead electrodes 5, 6 and the proximal end portions of the main electrodes 3, 4 adjoining to the power terminal lead electrodes which allow flow of a large amount of electric current are made wider to prevent burning. On the other hand, the main electrodes 3, 4 are tapered in width towards their distal ends as the current flow decreases.

The conventional planar heating device 10 is affixed to the mirror 16 by applying the heating device formed on the one side surface of the flexible insulating sheet 2 such as polyester terephthalate to the mirror 16 by means of the double faced adhesive tape 15. However, such a planar heating device had the disadvantage of low efficiency in heat energy utilization due to the long time required for the heat in the resistance film 9 to be conducted to the mirror 16, since the double faced adhesive tape 15 has a low thermal conductivity and yet has a relatively thick thickness of 0.1 to 0.2 mm.

In addition, bonding the heating device to the mirror 16 involves peeling off the release paper of the double faced adhesive tape 15 bonded to one side surface of the planar heating device 10 and then applying the latter with the aid of an application jig, resulting in requiring cumbersome and time-consuming operations to mount the heating device to the mirror, which was in turn impedimental to manufacturing inexpensive mirrors with heaters.

Moreover, due to being formed on the flexible insulating sheet 2 made of an organic material such as polyethylene terephthalate (PET), the conventional planar heating device required that the electrodes comprise silver electrically conductive film containing thermosetting resin such as epoxy, phenol, melamine resin and the like as binder. In order to obtain a satisfactory adhesive strength, it was required that such thermosetting resin which is an electrically insulating material be compounded with a weight ratio of at least about 30%, resulting in an increase in the resistivity. This led to the need for enlarging the width of the electrodes to provide a high tolerance for electric current, which correspondingly reduced the effective surface area of the heating device as well as undesirably increasing the material cost.

SUMMARY OF THE INVENTION

Accordingly, a first object of this invention is to provide a planar heating device which has a high efficiency in heat utilization for heating a mirror as well as having an enlarged heat producing surface area and which yet provides ease in affixing the heating device to the mirror.

A second object of this invention is to provide a method of manufacturing a planar heating device which achieves the first object of the invention.

According to this invention, a planar heating device for a mirror comprises a glass film formed on a metallic chrome film on the back side of the mirror; a group of electrodes formed on the glass film, the group including a pair of opposed main electrodes, a pair of power terminal lead electrodes extending from the corresponding main electrodes, and comb-like sub-electrodes extending from the corresponding main electrodes and power terminal lead electrodes so as to interdigit with each other; a resistance film formed on the glass film so as to cover the sub-electrodes; an electrically insulating film formed on the glass film having said resistance film formed thereon; and a pair of power terminals or power lead lines connected to the respective power terminal lead electrodes.

In the method according to this invention of producing a planar heating device for a mirror, a glass film is formed on a metallic chrome film on the back side of the mirror; a group of electrodes are formed on the glass film, the group including a pair of opposed main electrodes, a pair of power terminal lead electrodes extending from the corresponding main electrodes, and comb-like sub-electrodes extending from the corresponding main electrodes and power terminal lead electrodes so as to interdigit with each other; a resistance film is formed on the glass film so as to cover the sub-electrodes; an electrically insulating film is formed on the resistance film and the group of electrodes excluding the terminal lead electrodes and the power terminal connections of the power terminal lead electrodes; and a pair of power terminals or power lead lines are connected to the power terminal connections of the respective power terminal lead electrodes.

In the method according to this invention set forth above, the glass film may be formed directly on the back side of the mirror by screen printing or a or spray process.

In the method according to this invention set forth above, the group of electrodes may be formed directly on the back side of the mirror by screen printing.

In the method according to this invention set forth above, the resistance film may be formed directly on the back side of the mirror by screen printing.

In the method according to this invention set forth above, the power terminals or power lead lines may be connected to the power terminal connections of the respective power terminal lead electrodes by soldering.

In the method according to this invention set forth above, silver electrically conductive ink having inorganic glass as binder may be used as a material for the group of electrodes.

In the method according to this invention set forth above, the glass film, the group of electrodes and the resistance film may be printed in advance on a transfer paper sheet, followed by being transferred onto the back side of the mirror by a water transfer process.

DESCRIPTION OF THE PREFERRED EMBODIMENTS

Figure 1A:
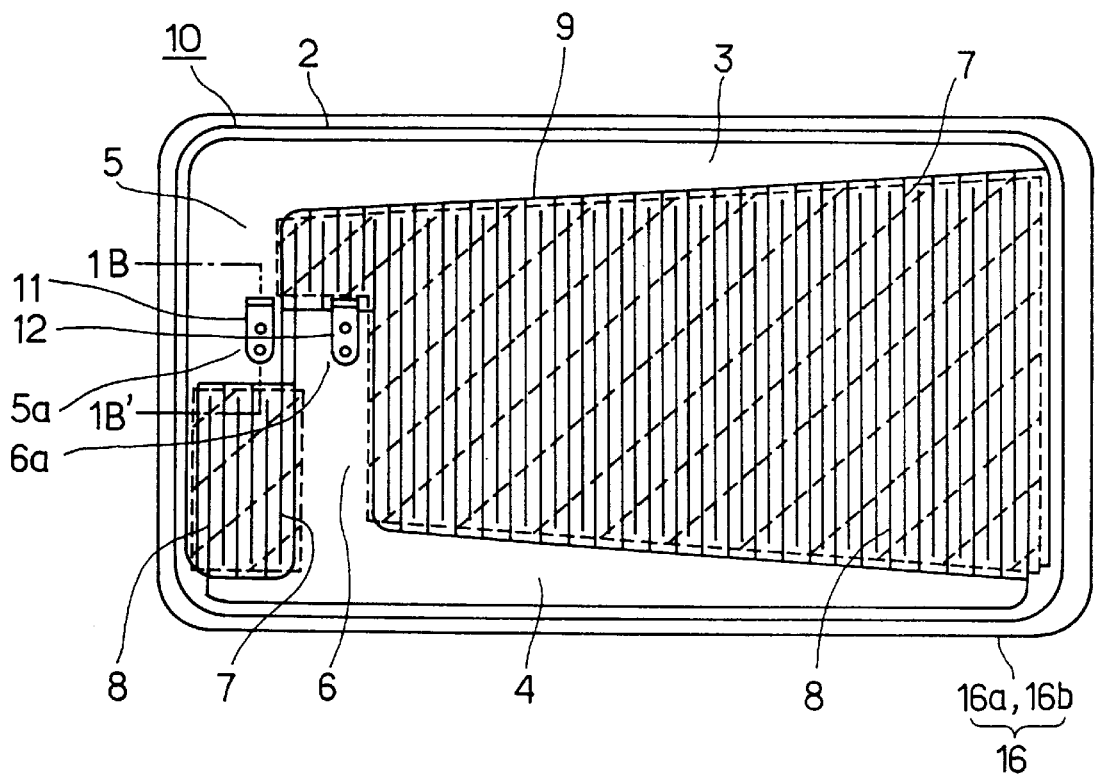
FIG. 1A is a plan view of a prior art planar heating device attached to the backside of a vehicle mirror.
Figure 1B:
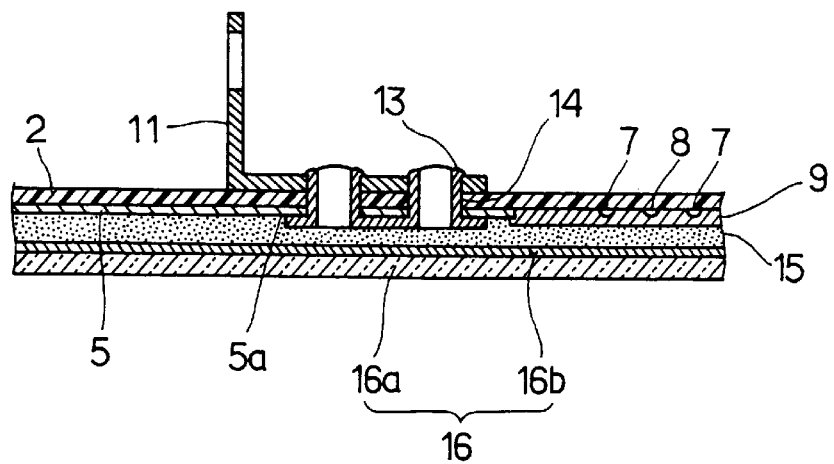
FIG. 1B is a cross-sectional view taken on line 1B—1B' in FIG. 1A.
Figure 2A:
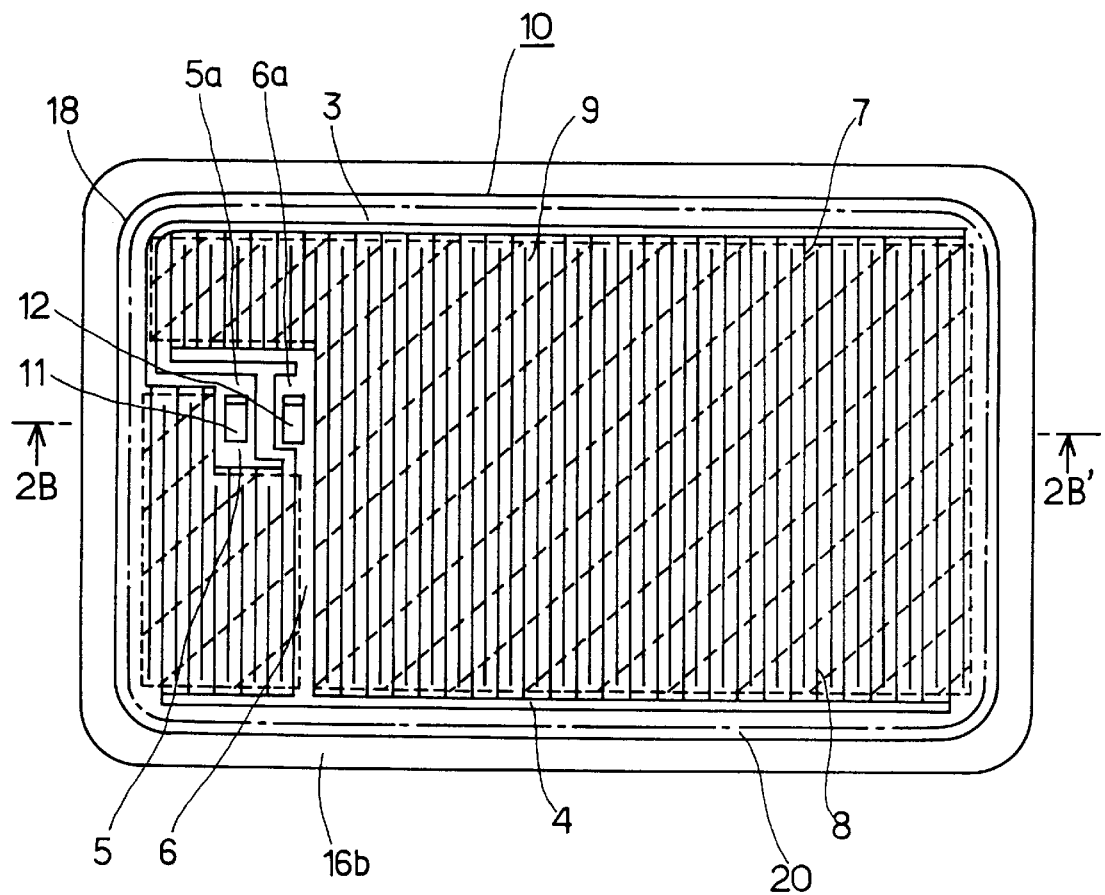
FIG. 2A is a plan view of an embodiment of this invention.

The invention will be described with reference with the embodiment illustrated in FIGS. 2A, 2B. In 2A, 2B, the parts corresponding to those shown in FIGS. 1A, 1B are indicated by like numerals.

According to this invention, an electrically insulating film 18 of borosilicate lead-glass (which will be referred to simply as glass film) is formed on the metallic chrome film 16b on the back side of the mirror 16 by screen printing or a spray process, and then baked. Subsequently, a pair of main strip-like electrodes 3, 4, power terminal lead electrodes 5, 6, and comb-like sub-electrodes 7, 8 are formed on the glass film 18 by screen printing using silver electrically conductive ink having borosilicate a binder, and then baked, followed by forming and baking a resistance film 9 having PTC property so as to cover the sub-electrodes 7, 8. An electrically insulating film 20 is then formed all over the main electrodes 3, 4, the power terminal lead electrodes 5, 6, (except the power terminal connections 5a, 6a) and the resistance film 9.

Power terminals 11, 12 or power lead lines are soldered to the respective power terminal connections 5a and 6a.

The insulating film 18, power terminal lead electrodes 5, 6, and sub-electrodes 7, 8 are screen printed directly onto the mirror 16 and baked if the mirror 16 is flat.

Figure 3A:
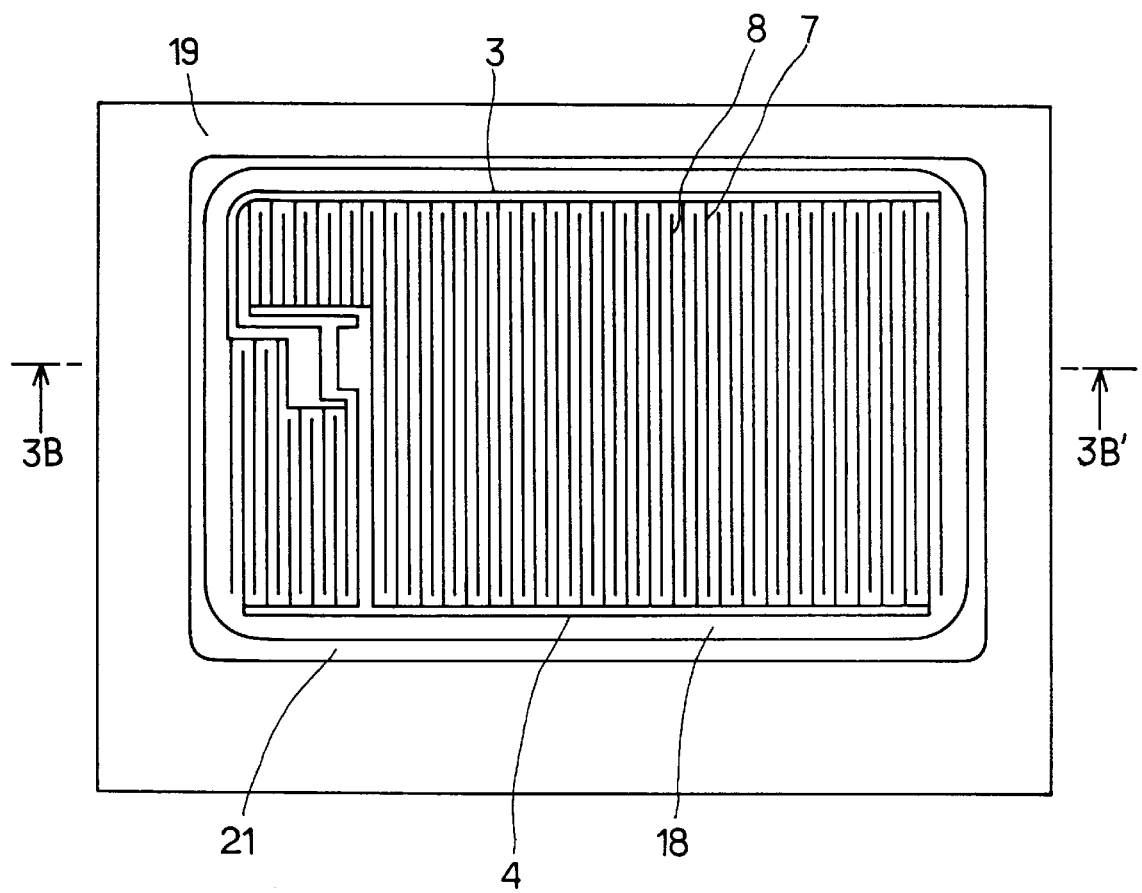
FIG. 3A is a plan view of the glass film 18 and the group of electrodes in FIG. 2A and FIG. 2B as preformed on the transfer paper sheet.
Figure 3B:
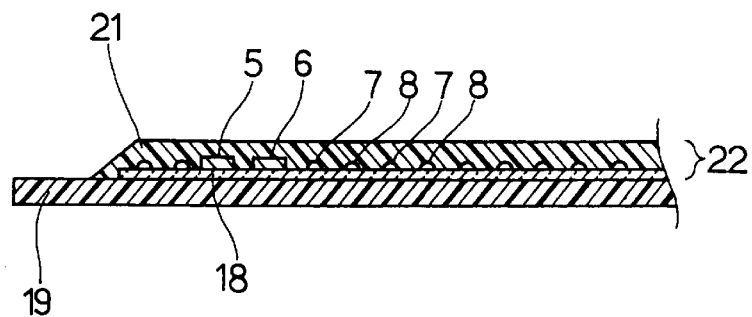
FIG. 3B is a cross-sectional view taken on line 3A.

For a curved mirror, as illustrated in FIG. 3A, 3B, an electrically insulating film 18 of borosilicate lead-glass is printed on a transfer paper sheet 19 for glass and is dried to give off the printing solvent to form a 5 to 60 μm thick film, followed by printing and drying the various electrodes 3, 4, 5, 6, 7, 8 of silver electrically conductive ink having borosilicate lead-glass as a binder, on which acrylic resin-based ink is screen printed as a protective film 21 and allowed to dry naturally, followed by being immersed in a stationary water tank where the resulting printed laminated film assembly 22 is gently peeled from the transfer paper sheet 19. The laminated film assembly 22 is then transferred to the back side of the mirror and baked. This is known as the water transfer process.

The reasons for making the insulating film 18 of borosilicate lead-glass are first to lower the curing temperature of the insulating film 18 for the purposes of preventing oxidation of the metallic chrome film which is used to form the mirror 16 as well as distortion of the mirror, and secondly to provide increased adhesive strength by the chemical bonding of the borosilicate lead-glass to the metallic chrome.

The silver electrically conductive ink used to form the electrodes 3 to 8 provides good adhesive strength even with a very small proportion of binder since borosilicate lead-glass of the same type as that of which the insulating film 18 is made is employed as a binder ingredient. This results in the electrodes exhibiting resistivity as low as about one hundred and twentieth ($1/120$) of that of conventional silver electrically conductive material containing organic resin as a binder. This has made it possible to reduce the pattern width of the main electrodes 3, 4 and power terminal lead electrodes 5, 6 as compared with the prior art, thereby increasing the heat producing surface area by about 10% as compared with the prior art.

In addition, due to an increased amount of metal contained in the electrode film material as well as by the use of the glass binder having a higher heat resistance than resin, it has become possible to connect the power terminals 11, 12 to the respective printed power terminal lead electrodes 5, 6 by direct soldering, which has been difficult with the prior art.

For a flat mirror, the PTC resistance film 9 is formed by screen printing and baking an ink directly onto the insulating film 18 and the sub-electrodes 7 and 8, the ink comprising thermoplastic resin as a basic ingredient and electrically conductive metallic powder, metallic oxide, carbon powder and carbon fibers incorporated in a dispersed manner in the resin.

Figure 4A:
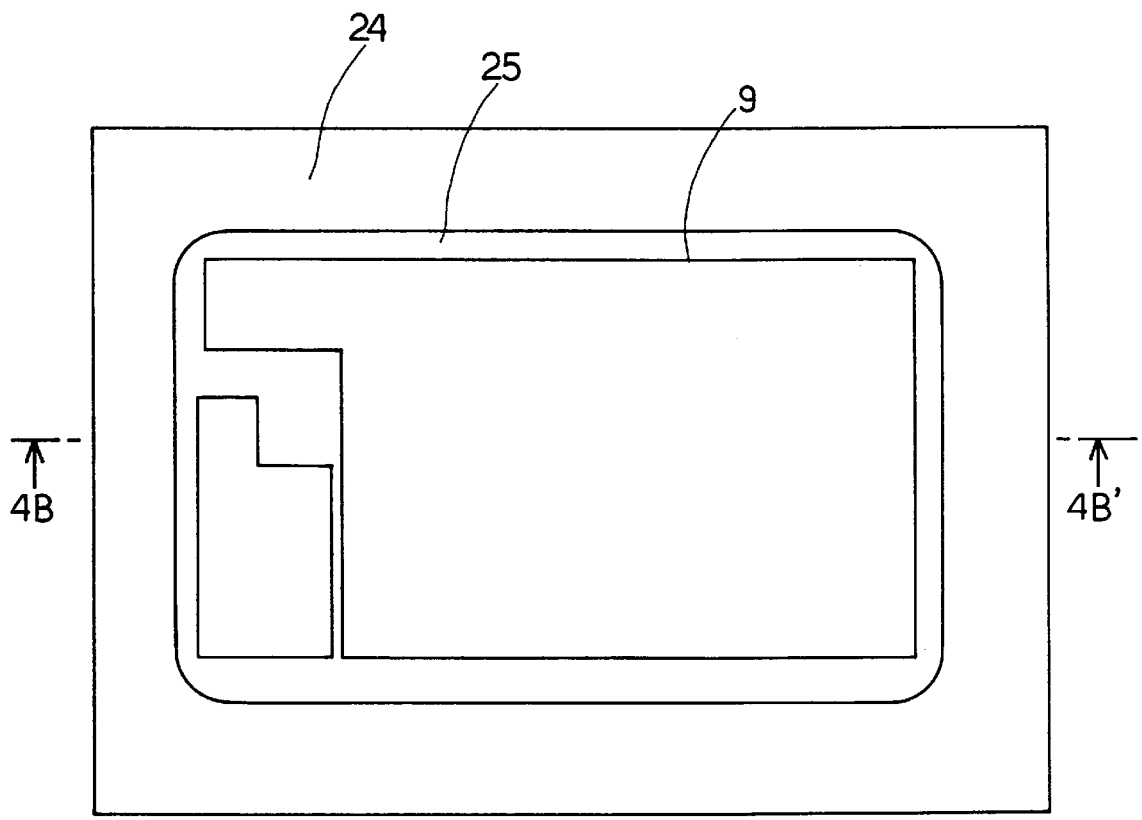
FIG. 4A is a plan view of the resistance film 9 in FIG. 2A and FIG. 2B as preformed on the transfer paper.
Figure 4B:
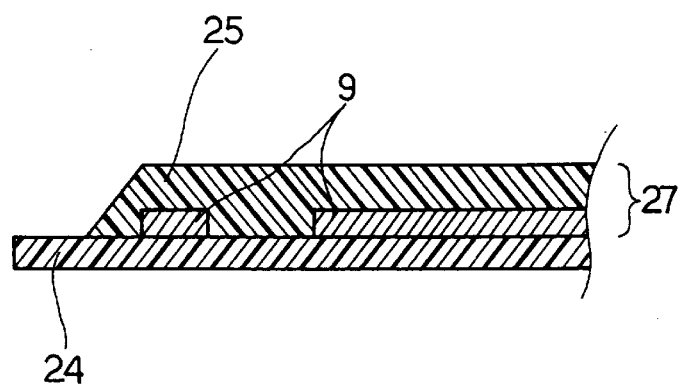
FIG. 4B is a cross-sectional view taken on line 4B—4B' in FIG. 4A.

For a curved mirror, as illustrated in FIGS. 4A, 4B, a PTC resistance film 9 is preformed by screen printing on a transfer paper sheet 24. The resistance film 9 is subsequently transferred onto the sub-electrodes 7, 8 by the water transfer process, followed by being baked.

Figure 5:
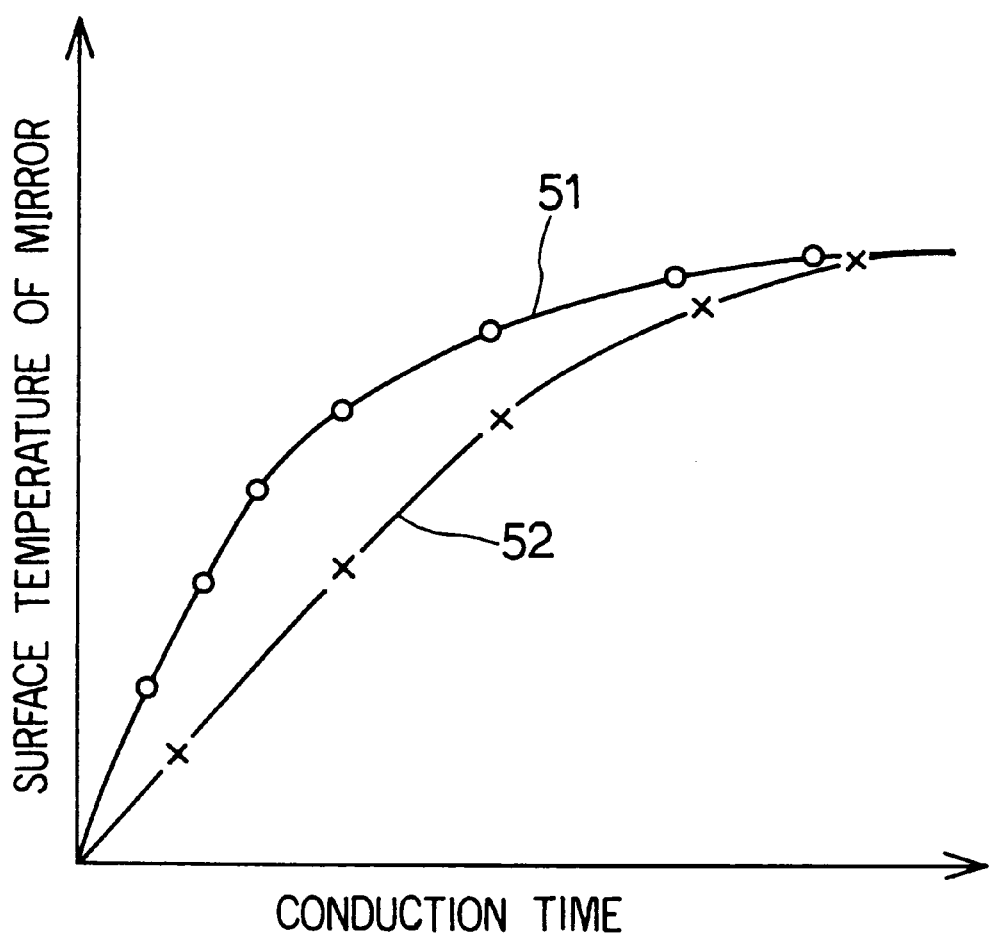
FIG. 5 is a graph showing the surface temperature of a mirror having the planar heating device 10 of FIG. 2A, 2B versus the conduction time as compared with the prior art.

The surface temperature of a mirror having the integral planar heating device according to this invention versus the conduction time during which electric current is supplied through the device is shown by a curve 51 in FIG. 5. The other curve 52 shows the results measured on the prior art article. It is evident from the graph that the inventive device can cause the mirror to reach a desired surface temperature in a shorter period of time during which electric current is supplied. This is because the heat utilization efficiency has been improved by enabling the heating device 10 to be provided with an enlarged heat producing surface area and by virtue of the glass film 18 being made considerably thinner than the conventional double faced adhesive tape.

The method according to this invention for producing the planar heating device of this invention will be described below in more details.

The Manufacturing Method 1

Step 1

Figure 2B:
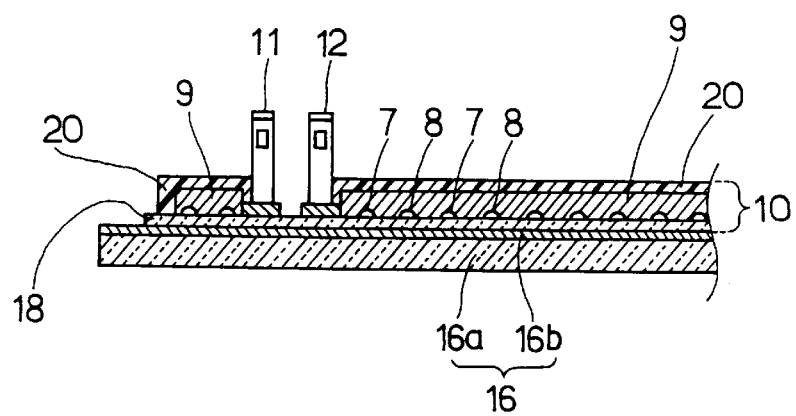
FIG. 2B is a cross-sectional view taken on line 2B—2B' in FIG. 2A.

In the first method of the present invention, an electrically insulating film 18 of borosilicate lead-glass is printed on the vapor deposited metallic chrome film 16b on the back side of the mirror 16 by screen printing process, as illustrated in FIG. 2B.

The electrically insulating printing ink useful in the present invention may be G-5204 manufactured by Shoei Chemical Co, Ltd., Japan comprising borosilicate lead-glass as a main ingredient blended with inorganic black pigment such as oxide of cobalt, organic solvent such as butyl carbitol, and a thickening agent such as ethyl cellulose. Such insulating ink is screen printed by using a screen mask such as stainless steel mesh screen of mesh size 250, and promptly (within about four hours) after the printing, the thus printed insulating film is dried at 150° C. for ten minutes in a constant temperature chamber to give off the organic solvent.

After the drying, the borosilicate lead-glass insulating film 18 is kept at 500° C. for ten minutes in a tunnel type electrical furnace, followed by being baked to the metallic chrome film 16b. The thickness of the insulating film 18 is chosen such as to be 5 to 30 $\mu$m, preferably 10 to 20 $\mu$m after baked.

It is to be noted that the foregoing printing and baking steps may be repeated two times to double the film thickness (to 10 to 60 $\mu$m) in order to prevent pinholing and thereby insure positive insulating properties of the film.

Step 2

In the next step, an electrode pattern comprising main electrodes 3, 4, power terminal lead electrodes 5, 6, and sub-electrodes 7, 8 is screen printed on the insulating film 18 by using a screen mask such as stainless steel mesh screen of mesh size 200. The printing ink used in this step may be H-4192 manufactured by Shoei Chemical Co, Ltd., Japan. Promptly (within about two hours) after the printing, the thus printed electrode pattern is dried at 150° C. for ten minutes in a constant temperature chamber to give off the organic solvent.

After the drying, the electrode pattern is kept at 500° C. for ten minutes in a tunnel type electrical furnace, followed by being baked to the insulating film 18. The film thickness of the electrode pattern is chosen such as to be 5 to 30 $\mu$m, preferably 10 to 20 $\mu$m after baked. It has been found that the resistivity of the resulting electrodes is $4.0 \times 10^{-7}$ $\Omega$cm. This means a reduction in resistivity by a factor of $1/120$ as compared with the resistivity of $4.8 \times 10^{-5}$ $\Omega$cm found in the silver electrically conductive film containing thermosetting organic resin as binder printed on the insulating sheet (PET) 2 of the prior art heating device. This enables a significant reduction in the width of the main electrodes 3, 4 and power terminal lead electrodes 5, 6, as compared with the prior art.

Step 3

The printing of the PTC resistance film 9 is also effected by screen printing so as to cover the sub-electrodes 7, 8, as is the case with the insulating glass film 18 and the electrode film 3-8. It is to be noted, however, that in order to enhance the PTC property, resistance film 9 is printed so as to have a relatively thicker film thickness in the range of 15 to 70 $\mu$m (after baked) by using a stainless steel mesh screen of mesh size 100 more coarse than the printing screen used for the screen printing of the electrode pattern.

The resistance paste useful for the printing of the resistance film 9 may comprise thermoplastic resin and electrically conducting material such as carbon powder, filler material and organic solvent blended and dispersed in the resin by the use of a roll mill, a masher or the like, the resulting resistivity depending on the compounding ratio of the electrically conducting material. The adjustment of the desired resistivity may be made by blending two kinds of resistance ink having different resistivities. The baking of resistance film is carried out by keeping it at 120° C.–200° C. for two to ten minutes in a tunnel type electrical furnace.

Step 4

In order to insure the protection and insulating property of the resistance film 9 and electrode film 3-8, an electrically insulating film 20 is formed to cover the insulating film 20 and the electrodes 3, 4, 5 and 6 except the power terminal connections 5a, 6a. The insulating film 20 may be formed by printing and baking thermosetting resin ink such as epoxy and phenol resins or the same thermoplastic resin insulating ink as the material of which the PTC resistance film 9 is made, or may in some instances be substituted for by a PET sheet with a single faced adhesive tape which is applied to the resistance and electrode films.

Especially, better PTC resistance property may be maintained when the insulating film is formed by the use of the same thermoplastic resin insulating ink as the resistance film or the PET insulating resistance film with a single faced adhesive tape to enhance the PTC property.

Step 5

Power terminals 11, 12 are soldered to the respective power terminal connections 5a and 6a with a resin-filled eutectic solder (eg. silver S256 manufactured by Senju Metal Co., Ltd., Japan) to complete a PTC heater directly mounted to a mirror.

The Manufacturing Method 2

Step 1

Electrically insulating ink (G-5204 manufactured by Shoei Chemical) comprising borosilicate lead-glass as a main ingredient is screen printed on a transfer paper sheet 19 (SPCII-UB manufactured by Marushige Paper Industry, Co., Ltd., Japan) by using a stainless steel mesh screen of mesh size 250, followed by being dried for about one to two hours in a hot-air constant temperature chamber at 30° C. to give off the organic solvent to thereby produce an insulating film 18.

Step 2

In the next step, an electrode pattern comprising main electrodes 3, 4, power terminal lead electrodes 5, 6, and sub-electrodes 7, 8 is screen printed on the insulating film 18 by using a screen mask such as stainless steel mesh screen of mesh size 200. The printing ink used in this step is H-4192 manufactured by Shoei Chemical, and the thickness of film produced is 5 to 30 $\mu$m (after being baked). The thus printed electrode pattern is then dried for about one to two hours in a hot-air constant temperature chamber at 30° C. to give off the organic solvent.

Step 3

Next, a protective film 21 is printed for protecting the thus formed laminated films during the subsequent transfer process. Specifically, printing ink DIANAL MR-2991 manufactured by Mitsubishi Rayon Corp. is screen printed by using a screen mask such as stainless steel mesh screen of mesh size 100 to cover the entire surface of the insulating film 18, followed by being allowed to dry naturally for about one to five hours.

Then, the resulting printed laminated film assembly 22 on the transfer paper sheet 19, comprising the insulating film 18, the electrodes 3-8 and the protective film 21 is transferred to a mirror 16, as will be described below.

Step 4

The first operation for the transfer is to gently immerse the transfer paper sheet 19 with the laminated film assembly 22 printed thereon in a water bath prepared in advance to dissolve the water-soluble adhesive agent applied to the transfer paper sheet 19 to separate the laminated film assembly 22 from the transfer paper sheet, promptly followed by applying the laminated film assembly to the back side of the mirror 16 in place. During the application operation a spatula made of urethane rubber is used to scrape out any bubbles and waterdrops between the mirror 16 and the laminated film assembly 22 to improve the adhesion of the film assembly to the mirror.

The mirror 16 now having the laminated film assembly 22 transferred thereto is dried to remove surplus moisture prior to being kept at 500° C. for ten minutes in a calcining furnace to burn out the organic ingredients contained in the protective film 21 for the transfer operation and the printed films while at the same time effecting the baking of the insulating film 18 and the electrode pattern 3-8 by fusing the glass ingredients.

Step 5

For the formation of PTC resistance film 9, PTC resistance material is screen printed on another transfer paper sheet 24 by using a stainless steel mesh screen of mesh size 100 to form a resistance film 9 of 15 to 70 $\mu$m in thickness (after being baked), and then dried in a hot-air constant temperature chamber at 30° C.

Step 6

Then, as a protective film 25 for protecting the thus formed laminated films during the subsequent second transfer process, printing ink DIANAL YR-4007 manufactured by Mitsubishi Rayon corp. is screen printed by using a screen mask such as stainless steel mesh screen of mesh size 100 to cover the entire surface of the resistance film 9, followed by being allowed to dry naturally for about one to five hours.

Step 7

Next, the printed laminated film assembly 27 on the transfer paper sheet 24, comprising the resistance film 9 and the protective film 25 is transferred to a mirror 16. Specifically, the transfer paper sheet 24 with the laminated film assembly 27 printed thereon is gently immersed in a water bath prepared in advance to dissolve the water-soluble adhesive agent applied to the transfer paper sheet 24 to separate the laminated film assembly 27 from the transfer paper sheet, promptly followed by applying the laminated film assembly to the back side of the mirror 16 in place. During the application operation a spatula made of urethane rubber is used to scrape out any bubbles and waterdrops between the mirror 16 and the laminated film assembly 27 to improve the adhesion of the film assembly to the mirror.

After the mirror assembly is allowed to stand at room temperature for 24 hours or more, the protective film 25 for the transfer operation is gently peeled off from one end prior to baking the resistance film 9. The baking is carried out by keeping the mirror assembly at 120° C.–200° C. for two to twenty minutes in a tunnel type electrical furnace.

Step 8

With a view to insuring the protection and insulating property of the resistance film 9 and electrode film 3-8, an electrically insulating film 20 is formed to cover the insulating film 20 and the electrodes 3, 4, 5 and 6 except the power terminal connections 5a, 6a. The insulating film 20 may be substituted for by a PET sheet with a single faced adhesive tape which is applied to the resistance and electrode films.

Step 9

Power terminals 11, 12 are soldered to the respective power terminal connections 5a and 6a with a resin-filled eutectic solder (eg. silver S256 manufactured by Senju Metal Co., Ltd.) to complete a PTC heater directly mounted to a mirror.

EFFECTS OF THE INVENTION

According to this invention, the resistance film 9 of the planar heating device is formed on the back side of a mirror through a glass film (5 to 60 $\mu$m thick) which is much thinner than the conventional double faced adhesive tape 15 (0.1 to 0.2 mm thick). Consequently, assuming that the glass film and the adhesive tape have approximately the same level of thermal conductivity, this invention permits the heat in the resistance film 9 to be conducted to the mirror 16 in a shorter time commensurate with the reduction in thickness of the glass film, contributing to alleviation of the problem in the prior art of low efficiency in heat energy utilization.

By forming the planar heating device by printing on the back side of a mirror, this invention eliminates the need for applying the planar heating device to the mirror by means of a double faced adhesive tape 15 as is the case with the prior art, thereby enhancing the ease in manufacturing such mirror having a built-in planar heating device.

In addition, according to this invention, the use as an electrode material of silver electrically conductive ink having as a binder an amount of borosilicate lead-glass much less than heretofore greatly reduces the resistivity of the electrodes as compared with the prior art, making it possible to reduce the width of the electrode group and to increase the heat producing surface area, as compared with the prior art.

Further, in this invention, the reduced width of the electrode group owing to the reduced resistivity leads to reduction in the amount used of silver electrically conductive ink, and hence reduced cost of the electrode material.

We claim:

1. A planar heating device in combination with a mirror having a front side and a back side, said planar heating device comprising:

a glass film formed on a metallic chrome film formed on the back side of the mirror;

a group of electrodes formed on said glass film, said electrodes being made of a material containing inorganic glass as a binder, said group of electrodes including a pair of opposed main electrodes, a pair of power terminal lead electrodes extending from corresponding main electrodes, and comb-like sub-electrodes extending from the corresponding main electrodes and power terminal lead electrodes so as to interdigitate one another;

a resistance film formed on said glass film so as to cover the sub-electrodes;

an electrically insulating film formed on said glass film over said resistance film; and a pair of power terminals or power lead lines connected by soldering to the respective power terminal lead electrodes.

2. A method of producing a planar heating device in combination with a mirror having a front side and a back side, said method comprising the steps of:

(a) forming a glass film on a metallic chrome film formed on the back side of the mirror;

(b) forming a group of electrodes on said glass film from a material containing inorganic glass as a binder, said group being formed to include a pair of opposed main electrodes, a pair of power terminal lead electrodes extending from corresponding main electrodes, and comb-like sub-electrodes extending from the corresponding main electrodes and power terminal lead electrodes so as to interdigitate with each other;

(c) forming a resistance film on said glass film so as to cover the sub-electrodes;

(d) forming an electrically insulating film on said resistance film and said group of electrodes excluding said terminal lead electrodes and power terminal connections of said power terminal lead electrodes; and (e) soldering a pair of power terminals or power lead lines to the power terminal connections of the respective power terminal lead electrodes.

* * * * *